United States Patent
Yamazaki

(10) Patent No.: US 10,180,234 B2
(45) Date of Patent: Jan. 15, 2019

(54) ILLUMINATION OPTICAL SYSTEM, ILLUMINATION APPARATUS, AND ILLUMINATION OPTICAL ELEMENT

(71) Applicant: OLYMPUS CORPORATION, Shibuya-ku, Tokyo (JP)

(72) Inventor: Kentaro Yamazaki, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 189 days.

(21) Appl. No.: 14/801,063

(22) Filed: Jul. 16, 2015

(65) Prior Publication Data
US 2016/0025299 A1    Jan. 28, 2016

(30) Foreign Application Priority Data
Jul. 24, 2014   (JP) .................. 2014-150901

(51) Int. Cl.
*F21V 5/04* (2006.01)
*G02B 19/00* (2006.01)
(Continued)

(52) U.S. Cl.
CPC ............. *F21V 5/045* (2013.01); *F21V 5/00* (2013.01); *G02B 19/0009* (2013.01); *G02B 21/08* (2013.01); *G02B 27/0905* (2013.01); *G02B 27/0972* (2013.01); *G02B 3/08* (2013.01); *G02B 5/045* (2013.01)

(58) Field of Classification Search
CPC ....... F21V 5/045; F21V 5/00; G02B 19/0009; G02B 21/08; G02B 27/0905; G02B 27/0972; G02B 3/08; G02B 5/045
See application file for complete search history.

(56) References Cited

U.S. PATENT DOCUMENTS 4,775,229 A * 10/1988 Ichihara ............. G02B 3/08
                                                       359/721
4,832,469 A *  5/1989 Noguchi ............ G02B 6/4204
                                                       250/585
(Continued)

FOREIGN PATENT DOCUMENTS

DE    10331768 A1    2/2005
FR     2995408 A1    3/2014
(Continued)

OTHER PUBLICATIONS

Extended European Search Report dated Jan. 5, 2016, issued in counterpart European Application No. 15176959.3.
(Continued)

*Primary Examiner* — Anh Mai
*Assistant Examiner* — Fatima Farokhrooz
(74) *Attorney, Agent, or Firm* — Holtz, Holtz & Volek PC

(57) ABSTRACT

An illumination optical system includes an illumination optical element that irradiates a predetermined area of an illumination target surface with light in a planar manner. The illumination optical element has an optical surface directed toward the illumination target surface. The optical surface has, in a perpendicular direction which is perpendicular to an optical axis, a plurality of refractive surfaces each of which refracts light toward the predetermined area and which are formed at a constant pitch determined by the predetermined area.

9 Claims, 17 Drawing Sheets

(51) Int. Cl.
  *G02B 21/08* (2006.01)
  *G02B 27/09* (2006.01)
  *F21V 5/00* (2018.01)
  *G02B 3/08* (2006.01)
  *G02B 5/04* (2006.01)

(56) References Cited

U.S. PATENT DOCUMENTS

| | | | |
|---|---|---|---|
| 5,005,959 A | 4/1991 | Nagata et al. | |
| 5,617,163 A * | 4/1997 | Ohtake | G03B 15/05 362/16 |
| 5,803,568 A | 9/1998 | Eckhardt | |
| 6,243,215 B1 * | 6/2001 | Hirota | G02B 3/08 359/742 |
| 2003/0039036 A1 * | 2/2003 | Kruschwitz | G02B 27/0927 359/707 |
| 2003/0223108 A1 | 12/2003 | Miyashita et al. | |
| 2005/0041307 A1 * | 2/2005 | Barone | G02B 3/08 359/742 |
| 2007/0113883 A1 * | 5/2007 | Rhee | G02B 3/08 136/246 |
| 2008/0030866 A1 | 2/2008 | Yamazaki | |
| 2008/0204901 A1 * | 8/2008 | Amano | G02B 3/08 359/742 |
| 2009/0073695 A1 | 3/2009 | Shimamoto | |
| 2009/0231858 A1 | 9/2009 | Yamazaki | |
| 2009/0250095 A1 * | 10/2009 | Thorley | F24J 2/085 136/246 |
| 2010/0150200 A1 * | 6/2010 | Ho | G02B 3/08 372/50.23 |
| 2010/0328765 A1 | 12/2010 | Dohi et al. | |
| 2011/0030765 A1 * | 2/2011 | Yang | F24J 2/085 136/246 |
| 2012/0038962 A1 * | 2/2012 | Lewis | G02B 26/0808 359/203.1 |
| 2012/0060920 A1 * | 3/2012 | Fornari | B29D 11/00269 136/259 |
| 2012/0147334 A1 * | 6/2012 | Mizushima | G02B 13/007 353/31 |
| 2013/0222756 A1 * | 8/2013 | Van Heugten | G02F 1/29 349/200 |
| 2013/0235479 A1 * | 9/2013 | Oi | G02B 3/08 359/742 |
| 2015/0124315 A1 * | 5/2015 | Sasahara | B29D 11/00269 359/457 |
| 2015/0226887 A1 | 8/2015 | Gombert et al. | |

FOREIGN PATENT DOCUMENTS

| | | |
|---|---|---|
| JP | 62008101 A | 1/1987 |
| JP | 01112214 A | 4/1989 |
| JP | 11326605 A | 11/1999 |
| JP | 2000162705 A | 6/2000 |
| JP | 2004004169 A | 1/2004 |
| JP | 2005043517 A | 2/2005 |
| JP | 2010134191 A | 6/2010 |
| JP | 4579554 B2 | 11/2010 |
| JP | 2011028249 A | 2/2011 |
| JP | 2012118139 A | 6/2012 |
| JP | 5086580 B2 | 11/2012 |
| JP | 2013088338 A | 5/2013 |
| JP | 62008101 A | 1/2018 |
| WO | 2014037580 A1 | 3/2014 |

OTHER PUBLICATIONS

Japanese Office Action dated Apr. 17, 2018 issued in counterpart Japanese Application No. 2014-150901.
European Office Action dated Oct. 10, 2018 issued in counterpart European Applicaiton No. 15176959.3.

* cited by examiner

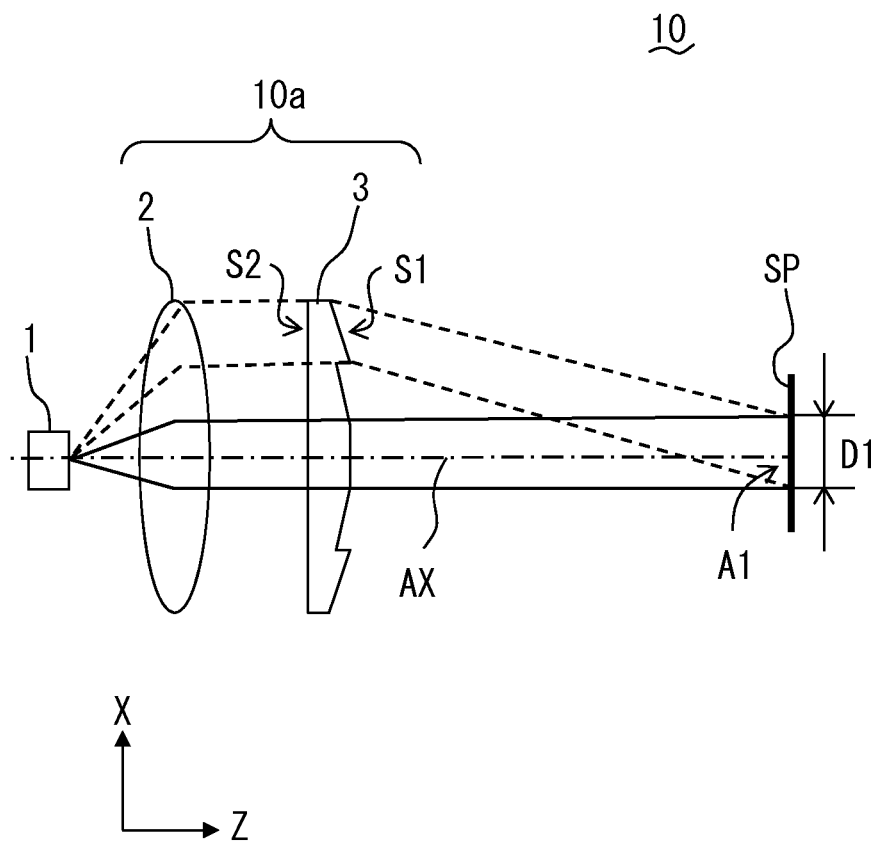
F I G. 1

<PRIOR ART>

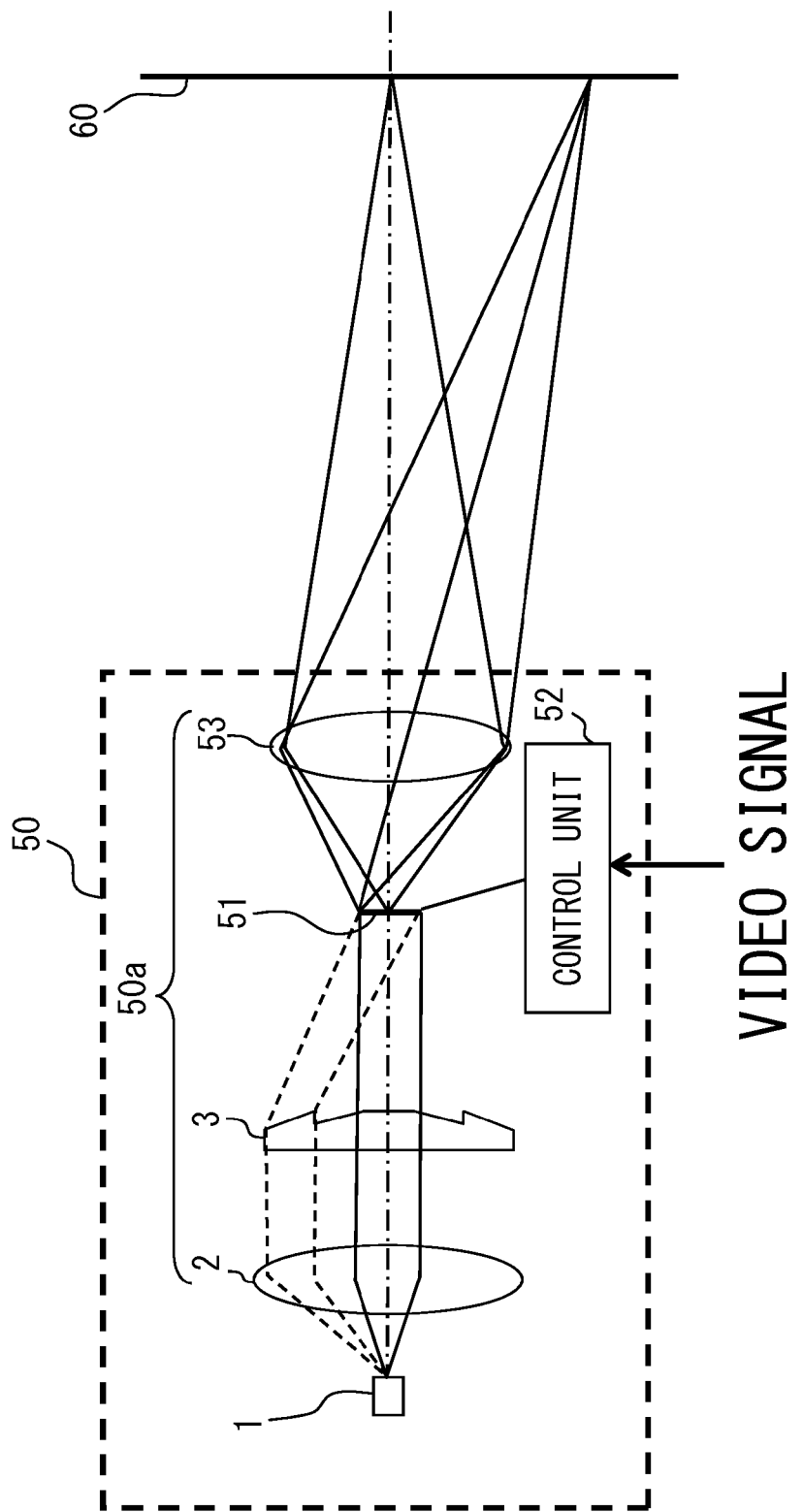
F I G. 13

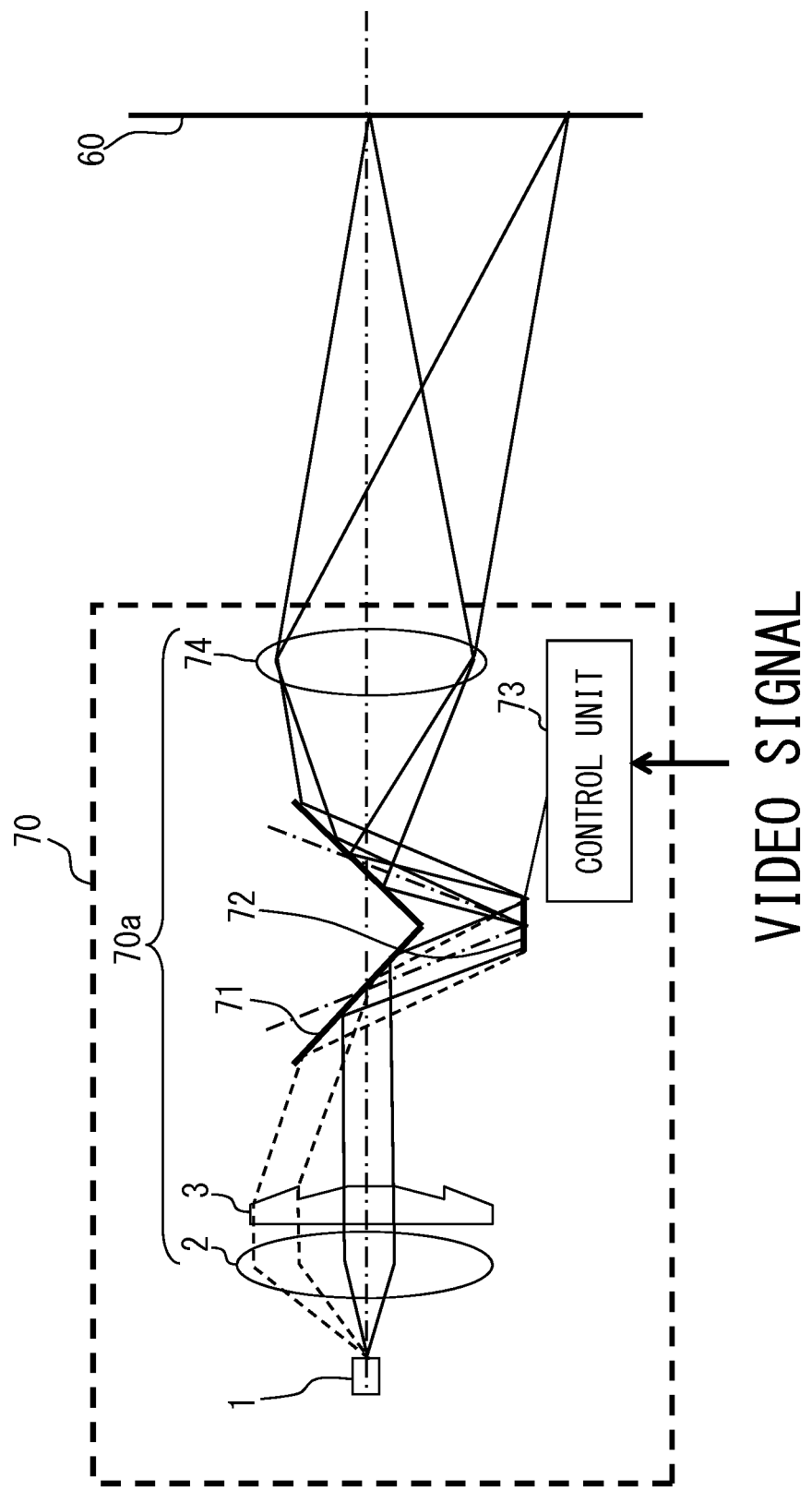
F I G. 14

ILLUMINATION OPTICAL SYSTEM, ILLUMINATION APPARATUS, AND ILLUMINATION OPTICAL ELEMENT

CROSS REFERENCE TO RELATED APPLICATIONS

This application is based upon and claims the benefit of priority from prior Japanese Patent Application No. 2014-150901, filed Jul. 24, 2014, the entire contents of which are incorporated herein by this reference.

BACKGROUND OF THE INVENTION

Field of the Invention

The present invention relates to an illumination optical system that includes an illumination optical element that illuminates an illumination target surface in a planar manner, and an illumination apparatus, and further relates to the illumination optical element that illuminates an illumination target surface in a planar manner.

Description of the Related Art

In the fields of microscopy and semiconductor exposure apparatuses, Kohler illumination is generally applied for illuminating a specimen surface uniformly. However, Kohler illumination causes non-uniformity of illumination due to characteristics in which an intensity of light emitted from a light source varies by exit angle (hereinafter referred to as "light distribution characteristics"). Thus, a technology to suppress non-uniformity of illumination caused by the light distribution characteristics of the Kohler illumination by use of fly eye lenses has been proposed. Such a technology is described, for example, in Japanese Laid-open Patent Publication No. 2004-4169.

SUMMARY OF THE INVENTION

An aspect of the present invention permits providing of an illumination optical system that includes an illumination optical element irradiating a predetermined area of an illumination target surface with light in a planar manner, in which the illumination optical element has an optical surface directed toward the illumination target surface, in which the optical surface has, in a perpendicular direction which is perpendicular to an optical axis, a plurality of refractive surfaces each of which refracts light toward the predetermined area and which are formed at a constant pitch determined by the predetermined area.

Another aspect of the present invention permits providing of an illumination apparatus including the illumination optical system in the above-described aspect.

Yet another aspect of the present invention permits providing of an illumination optical element that irradiates a predetermined area of an illumination target surface with light in a planar manner and has an optical surface directed toward the illumination target surface, in which the optical surface has, in a perpendicular direction which is perpendicular to an optical axis, a plurality of refractive surfaces each of which refracts light toward the predetermined area and which are formed in the perpendicular direction at a constant pitch determined by the predetermined area.

BRIEF DESCRIPTION OF THE DRAWINGS

FIG. 1 illustrates a configuration of an illumination apparatus according to a first embodiment of the present invention;

FIGS. 3A to 3C illustrate light intensity distributions of illumination light on each surface of the illumination apparatus according to the first embodiment of the present invention, in which FIG. 3A illustrates a light intensity distribution in an angular direction of light emitted from a light source, FIG. 3B illustrates a light intensity distribution in a direction of a beam diameter of light entering the illumination optical element, and FIG. 3C illustrates a light intensity distribution in a specimen surface;

FIG. 13 illustrates a configuration of a projector according to a sixth embodiment of the present invention;

FIG. 14 illustrates a configuration of a projector according to a seventh embodiment of the present invention;

DESCRIPTION OF THE EMBODIMENTS

In order to suppress non-uniformity of illumination caused by the light distribution characteristics by use of fly eye lenses, in addition to the fly eye lenses, another lens is needed to overlap lights from a plurality of light source images formed by the fly eye lenses and to irradiate the same area of an illumination target surface with the overlapped lights.

Hereafter, explanations are given for embodiments of the present invention.

<First Embodiment>

Figure 2:
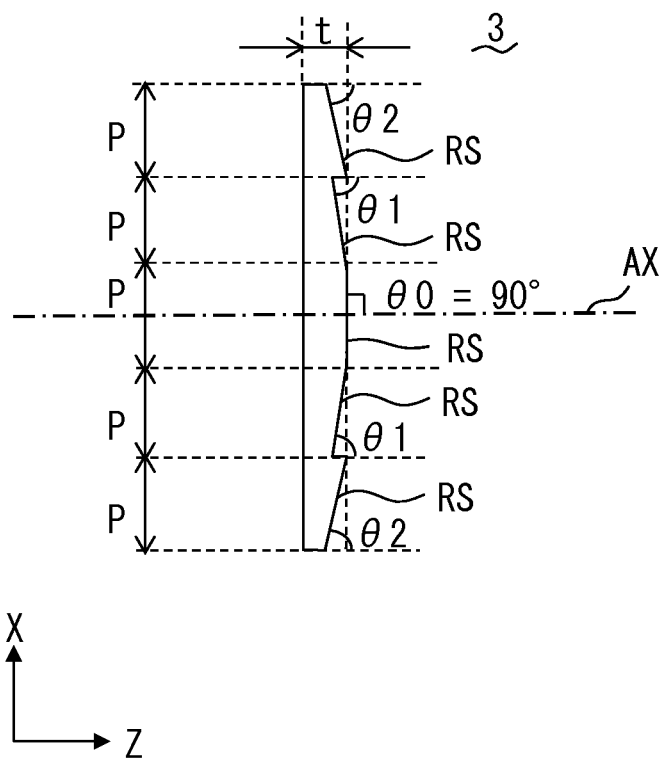
FIG. 2 illustrates an illumination optical element according to the first embodiment of the present invention.
Figure 3A:
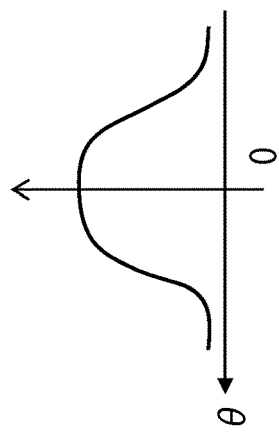
Figure 3B:
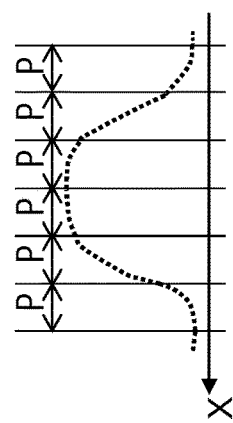
Figure 3C:
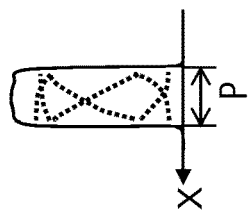

FIG. 1 illustrates a configuration of an illumination apparatus 10 according to the present embodiment. FIG. 2 illustrates an illumination optical element 3 according to the present embodiment. FIGS. 3A to 3C illustrate light intensity distributions of illumination light on each surface of the illumination apparatus 10 according to the present embodiment.

The illumination apparatus 10 illuminates in a planar manner an area A1 of a specimen surface SP that is an illumination target surface. As illustrated in FIG. 1, the illumination apparatus 10 includes a light source 1 which emits illumination light, and an illumination optical system 10a. The illumination optical system 10a irradiates the area A1 of the specimen surface SP in a planar manner with light from the light source 1, and includes a collector lens 2 and the illumination optical element 3.

The light source 1 is, for example, a lamp light source such as a halogen lamp. The light source 1 has light distribution characteristics as illustrated in FIG. 3A. The horizontal axis θ in FIG. 3A represents an exit angle with respect to an optical axis AX. As illustrated in FIG. 3A, the light source 1 has light distribution characteristics approximately symmetric about the optical axis AX, and illumination lights having different light intensities depending on exit angle are emitted from the light source 1. The light source 1 is not limited to a lamp light source and may be other light sources such an LED light source.

The collector lens 2 collimates light emitted from the light source 1 so as to inject it into the illumination optical element 3 in the form of a collimated beam. This converts a distribution of light intensity in an angular direction of the light emitted from the light source 1 (see FIG. 3A) into a distribution of light intensity in a direction of a beam diameter of the light entering the illumination optical element 3 (see FIG. 3B). The direction of the horizontal axis X in FIG. 3B corresponds to the X direction illustrated in FIG. 2.

The illumination optical element 3 irradiates in a planar manner the area A1 of the specimen surface SP (illumination target surface) with the light which has entered in the form of a collimated beam. Material of the illumination optical element 3 includes glass, plastic, and crystalline material (such as silica glass). The illumination optical element 3 has an optical surface S1 directed toward the specimen surface SP and an optical surface S2 that is a second optical surface opposite the optical surface S1.

The optical surface S2 is a flat surface perpendicular to the optical axis AX. On the other hand, in a direction perpendicular to the optical axis AX (for example, the X direction illustrated in FIG. 1. It is hereinafter referred to as "perpendicular direction"), the optical surface S1 has a plurality of refractive surfaces RS each of which refracts light toward the area A1, as illustrated in FIG. 2.

The plurality of refractive surfaces RS are formed in a perpendicular direction at a constant pitch P. The pitch P (that is, a width in a perpendicular direction of each of the plurality of refractive surfaces RS) is a width D1 in a perpendicular direction of the area A1. Further, the plurality of refractive surfaces RS have, in a section along the optical axis AX (for example, the XZ section), shapes of lines that form different angles (angles θ0≠θ1≠θ2) with the optical axis AX. Further, a refractive surface RS which is closer to the optical axis AX forms a larger angle with the optical axis AX in a section along the optical axis AX (θ0>θ1>θ2). In FIG. 2, the illumination optical element 3 is configured so that each of the respective areas in which the refractive surfaces RS are formed has a constant maximum thickness t. For that reason, a refractive surface located farther from the optical axis AX forms a deeper groove in the illumination optical element 3.

The light which has entered the illumination optical element 3 as a collimated beam is transmitted through the optical surface S2 to enter the optical surface S1, and is divided, in the optical surface S1, for each of the refractive surfaces RS which the light has entered. The divided lights are collimated beams each of which has a beam diameter of the pitch P, and, as illustrated in FIG. 3B, have different light intensity distributions corresponding to different ranges of exit angle in the light source 1.

After that, each of the divided lights is refracted in each of the refractive surfaces RS toward the area A1 so as to enter the area A1 while remaining in the form of a collimated beam. In other words, the lights obtained by the division of light for each predetermined range of exit angles in the illumination optical element 3 overlap in the area A1, as illustrated in FIG. 3C. This permits averaging, in the specimen surface SP (area A1), of the non-uniform light intensity distribution caused by the light distribution characteristics. FIG. 3C illustrates a light intensity distribution in the specimen surface SP.

The present embodiment permits suppressing of non-uniformity of illumination caused by the light distribution characteristics of the light source 1. This results in illuminating the specimen surface SP (illumination target surface) uniformly. Further, the embodiment permits, with fewer optical elements and more easily as compared to a conventional art, suppressing of non-uniformity of illumination caused by the light distribution characteristics of the light source 1. This will now be described in detail.

Figure 4:
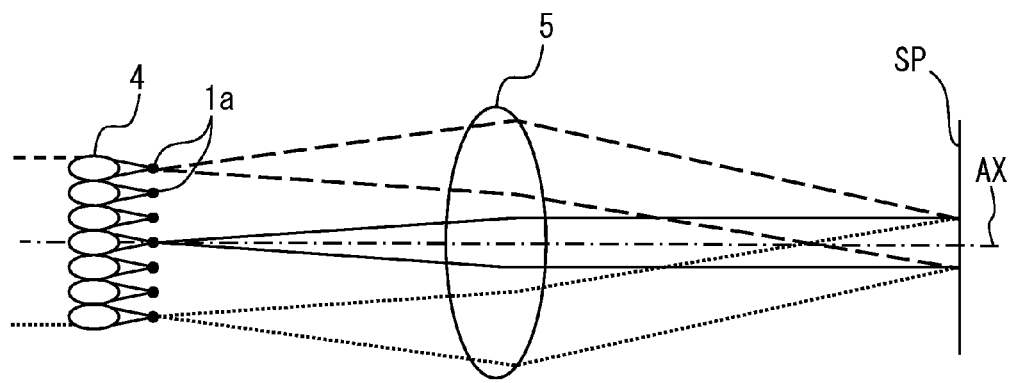
FIG. 4 illustrates a configuration of a conventional illumination apparatus which includes fly eye lenses.

FIG. 4 illustrates a configuration of a conventional illumination apparatus which includes fly eye lenses 4. The fly eye lenses 4 have a similar function to the illumination optical element 3 in dividing light emitted from a light source for each predetermined range of exit angles. However, differently from the illumination optical element 3, the fly eye lenses 4 collect the divided lights so as to form a plurality of light source images 1a. For that reason, the conventional illumination apparatus including fly eye lenses 4 needs, in addition to the fly eye lenses 4, a condenser lens 5 to irradiate a specimen surface SP with each of the lights from the plurality of light source images 1a formed by the fly eye lenses 4, so as to use the Kohler illumination.

On the other hand, the illumination optical element 3 directly irradiates the specimen surface SP with divided lights without collecting them. This permits the illumination optical element 3 to have functions of the fly eye lenses 4 and the condenser lens 5 at the same time. Thus, the embodiment permits, with fewer optical elements as compared to a conventional art, suppressing of non-uniformity of illumination caused by the light distribution characteristics of the light source 1, so as to illuminate the specimen surface SP (illumination target surface) uniformly.

Further, in general, when a fly eye lens is used, just one is not used, but two are used side-by-side. In addition, in order to realize a high uniformity of illumination, it is necessary to accurately arrange one fly eye lens with respect to another one.

On the other hand, a high accuracy as required for the arrangement of fly eye lenses is not required to arrange the illumination optical element 3. Thus, the illumination optical system 10a and the illumination apparatus 10 including the illumination optical element 3 according to the present embodiment permit more easily suppressing of non-uniformity of illumination, as compared to a conventional art.

Further, the illumination optical element 3 can be easily produced by cutting a material because the section of a refractive surface RS has a linear shape. The illumination optical element 3 may be produced by use of a mold. In this case, a mold for the illumination optical element 3 can be easily produced by cutting.

Figure 5:
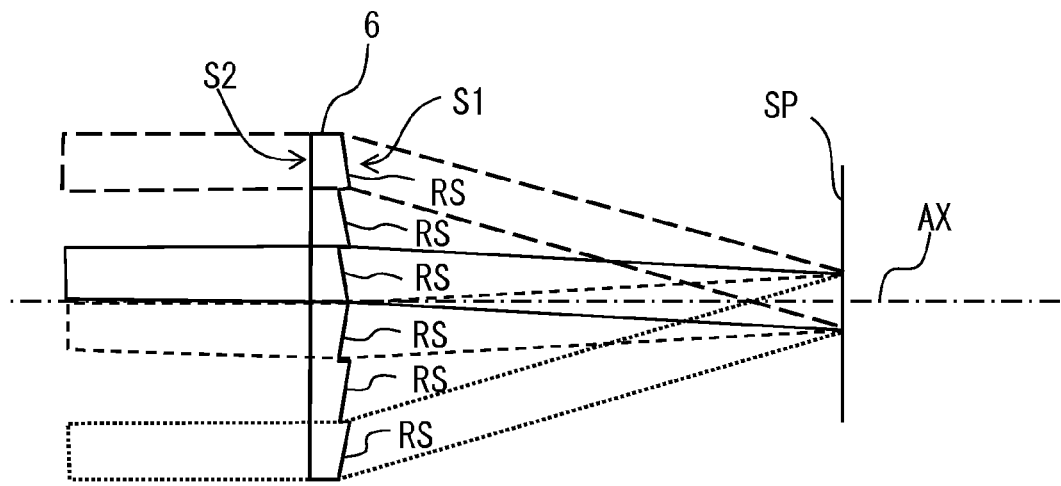
FIG. 5 illustrates a variant of the illumination optical element according to the first embodiment of the present invention.

The illumination optical element 3 illustrated in FIG. 2 has, on the optical axis AX, a refractive surface RS perpendicular to the optical axis AX, but embodiments of the present invention are not limited to the illumination optical element having this configuration. An illumination optical element may be configured so that the optical axis AX passes through the boundary between refractive surfaces RS and the refractive surfaces RS in contact with the optical axis AX are inclined with respect to a plane perpendicular to the optical axis AX, like an illumination optical element 6 according to a variant illustrated in FIG. 5.

Figures 6A, 6B:
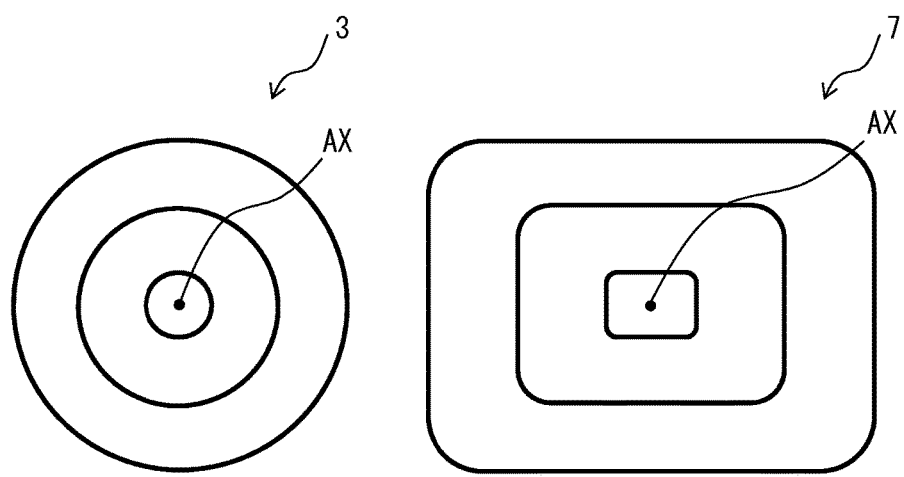
FIG. 6A illustrates the illumination optical element as viewed from a direction along an optical axis AX.
FIG. 6B illustrates the illumination optical element that is a variant of the illumination optical element according to the first embodiment of the present invention, as viewed from a direction along the optical axis AX.

When a light source has light distribution characteristics symmetric about an optical axis, preferably an illumination optical element, too, has a symmetric shape. FIG. 6A illustrates the illumination optical element 3 as viewed from a direction along the optical axis AX. When the specimen surface SP illuminated by the illumination apparatus 10 is observed by, for example, an ocular lens, an illumination optical element preferably has a shape approximately point-symmetric about the optical axis AX (in this case, circular shape), like the illumination optical element 3 illustrated in FIG. 6A. FIG. 6B illustrates an illumination optical element 7 as viewed from a direction along the optical axis AX that is a variant of the illumination optical element 3. When the specimen surface SP is imaged with, for example, a camera, an illumination optical element preferably has a shape conforming to a shape of an imaging element, like the illumination optical element 7 illustrated in FIG. 6B, preferably a shape approximately line-symmetric with respect to a reference line including the optical axis AX (in this case, rectangular shape).

<Second Embodiment>

In general, a numerical aperture (NA) required for an illumination apparatus varies by observation magnification. For example, the NA required for an illumination apparatus is about 0.4 when the observation magnification is 10×, it is about 0.7 when the observation magnification is 20×, and it is about 0.95 when the observation magnification is 40×. An area required to be illuminated is smaller for a higher magnification. Thus, an area to be illuminated is smaller if a required NA is higher. On the basis of the discussion above, the present embodiment permits suppressing of non-uniformity of illumination caused by the light distribution characteristics of a light source and realizing of an illumination which covers a wide range of observation magnification.

Figure 7:
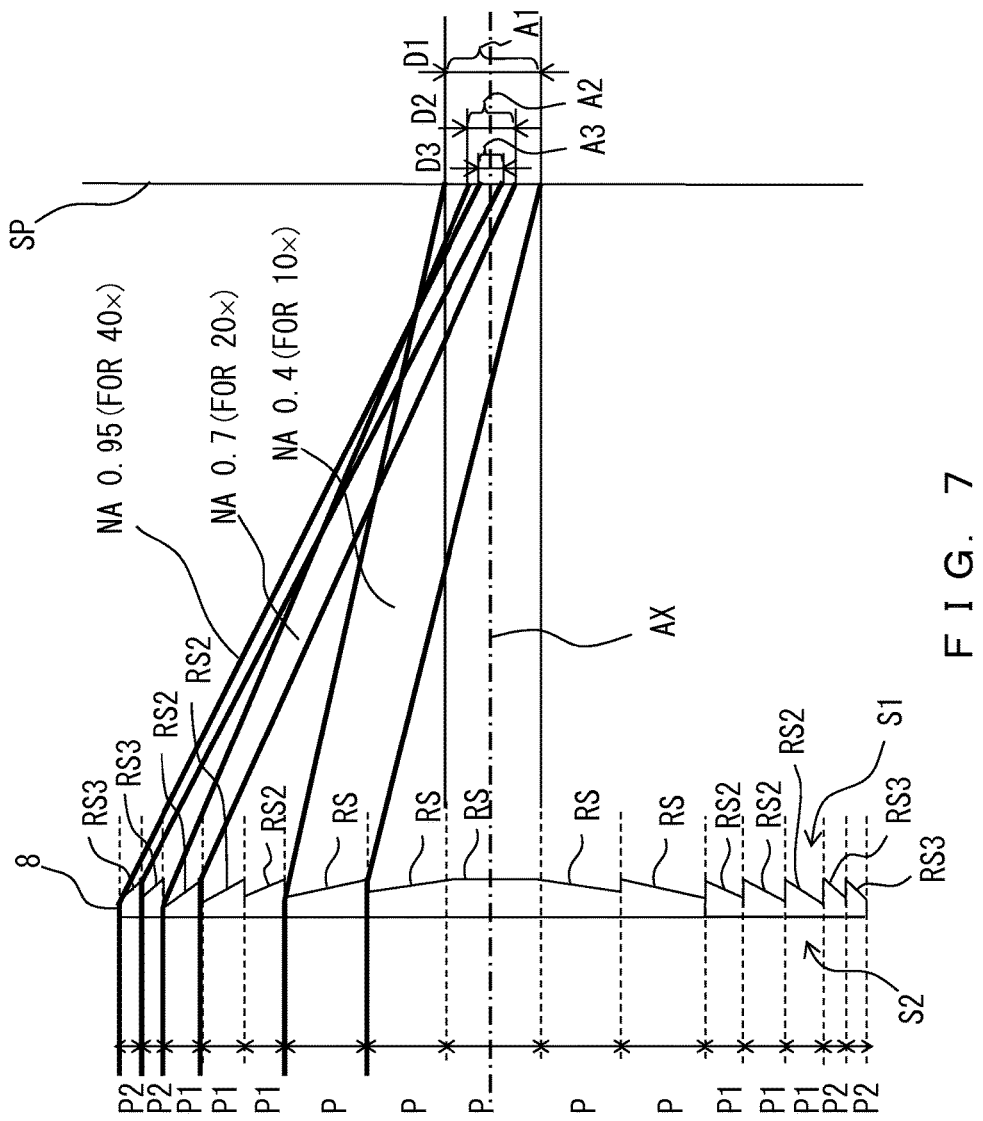
FIG. 7 illustrates a configuration of an illumination optical element according to a second embodiment of the present invention.

FIG. 7 illustrates a configuration of an illumination optical element 8 according to the present embodiment. An illumination optical system and an illumination apparatus according to the present embodiment are similar to the illumination optical system 10a and the illumination apparatus 10 according to the first embodiment except for including the illumination optical element 8 instead of the illumination optical element 3. The illumination optical element 8 is different from the illumination optical element 3 in having, in addition to a plurality of refractive surfaces RS, a plurality of refractive surfaces RS2 and a plurality of refractive surfaces RS3 on an optical surface S1. An example in which a refractive surface RS, a refractive surface RS2, and a refractive surface RS3 in the illumination optical element 8 form illuminations for 10× observation, for 20× observation, and for 40× observation, respectively, will now be described.

The plurality of refractive surfaces RS are similar to the plurality of refractive surfaces RS of the illumination optical element 3. A pitch P of the plurality of refractive surfaces RS is the same as a width D1 in a perpendicular direction of the area A1 to be illuminated when observing at 10× magnification. A refractive surface RS farthest from an optical axis AX is inclined so that a light refracted on the refractive surface RS enters the area A1 with an NA of 0.4.

The plurality of refractive surfaces RS2 that are a plurality of second refractive surfaces are formed, in a perpendicular direction, farther away than the plurality of refractive surfaces RS from the optical axis AX, and each is configured so as to refract light toward a portion of the area A1 (area A2). The plurality of refractive surfaces RS2 are similar to the plurality of refractive surfaces RS in having, in a section along the optical axis AX, shapes of lines that form different angles with the optical axis AX and in that a refractive surface RS2 which is closer to the optical axis AX forms a larger angle with the optical axis AX in a section along the optical axis AX.

The plurality of refractive surfaces RS2 are different from the plurality of refractive surfaces RS in being formed in a perpendicular direction at a constant pitch P1 that is shorter than the pitch P at which the plurality of refractive surfaces RS are formed. The pitch P1 is the same as a width D2 in a perpendicular direction of the area A2 to be illuminated when observing at 20× magnification. A refractive surface RS2 farthest from the optical axis AX is inclined so that a light refracted on the refractive surface RS2 enters the area A2 with an NA of 0.7.

The plurality of refractive surfaces RS3 that are a plurality of third refractive surfaces are formed, in a perpendicular direction, farther away than the plurality of refractive surfaces RS2 from the optical axis AX, and each is configured so as to refract light toward a portion of the area A2 (area A3). The plurality of refractive surfaces RS3 are similar to the plurality of refractive surfaces RS and the plurality of refractive surfaces RS2 in having, in a section along the optical axis AX, shapes of lines that form different angles with the optical axis AX and in that a refractive surface RS3 which is closer to the optical axis AX forms a larger angle with the optical axis AX in a section along the optical axis AX.

The plurality of refractive surfaces RS3 are different from the plurality of refractive surfaces RS and the plurality of refractive surfaces RS2 in being formed in a perpendicular direction at a constant pitch P2 that is shorter than the pitch P1 at which the plurality of refractive surfaces RS2 are formed. The pitch P2 is the same as a width D3 in a perpendicular direction of the area A3 to be illuminated when observing at 40× magnification. A refractive surface RS3 farthest from the optical axis AX is inclined so that a light refracted on the refractive surface RS3 enters the area A3 with an NA of 0.95.

Also in the present embodiment, the lights obtained by division of light for each predetermined range of exit angles in the illumination optical element 8 overlap in a specimen surface SP. Thus, as is the case with the first embodiment, the present embodiment permits, with fewer optical elements and more easily as compared to a conventional art, suppressing of non-uniformity of illumination caused by the light distribution characteristics of a light source. The embodiment further permits providing of an illumination which covers a wide range of observation magnification from 10× to 40×. This will now be described specifically.

Consider a case in which a specimen is observed at 10×. Among the lights which have entered the area A1 that is a range to be observed, the lights with an NA exceeding 0.4 cause vignetting in an observation optical system such as an objective for 10×. Thus, an observation image is formed by the lights with an NA within 0.4. As a result, non-uniformity of illumination in the area A1 that is caused by the lights with an NA exceeding 0.4 (such as lights with an NA of 0.7 and with an NA of 0.95) is not observed.

Consider a case in which a specimen is observed at 20×. Among the lights which have entered the area A2 that is a range to be observed, the lights with an NA exceeding 0.7 cause vignetting in an observation optical system such as an objective for 20×. Thus, an observation image is formed by the lights with an NA within 0.7 (such as lights with an NA of 0.4 and with an NA of 0.7) which illuminate the area A2 uniformly. As a result, non-uniformity of illumination in the area A2 that is caused by the lights with an NA exceeding 0.7 (such as a light with an NA of 0.95) is not observed.

Consider a case in which a specimen is observed at 40×. The lights which enter the area A3 that is a range to be observed are the light with an NA within 0.4 that is refracted on a refractive surface RS and illuminates the area A1 uniformly, the light with an NA within 0.7 that is refracted on a refractive surface RS2 and illuminates the area A2 uniformly, and the light with an NA exceeding 0.7 that is refracted on a refractive surface RS3 and illuminates the area A3 uniformly. Thus, the area A3 is illuminated by those lights uniformly, with the result that non-uniformity of illumination is not observed.

As described above, the embodiment permits realizing of an illumination which covers a wide range of observation magnification without non-uniformity of the illumination being observed at any magnification.

Figure 8:
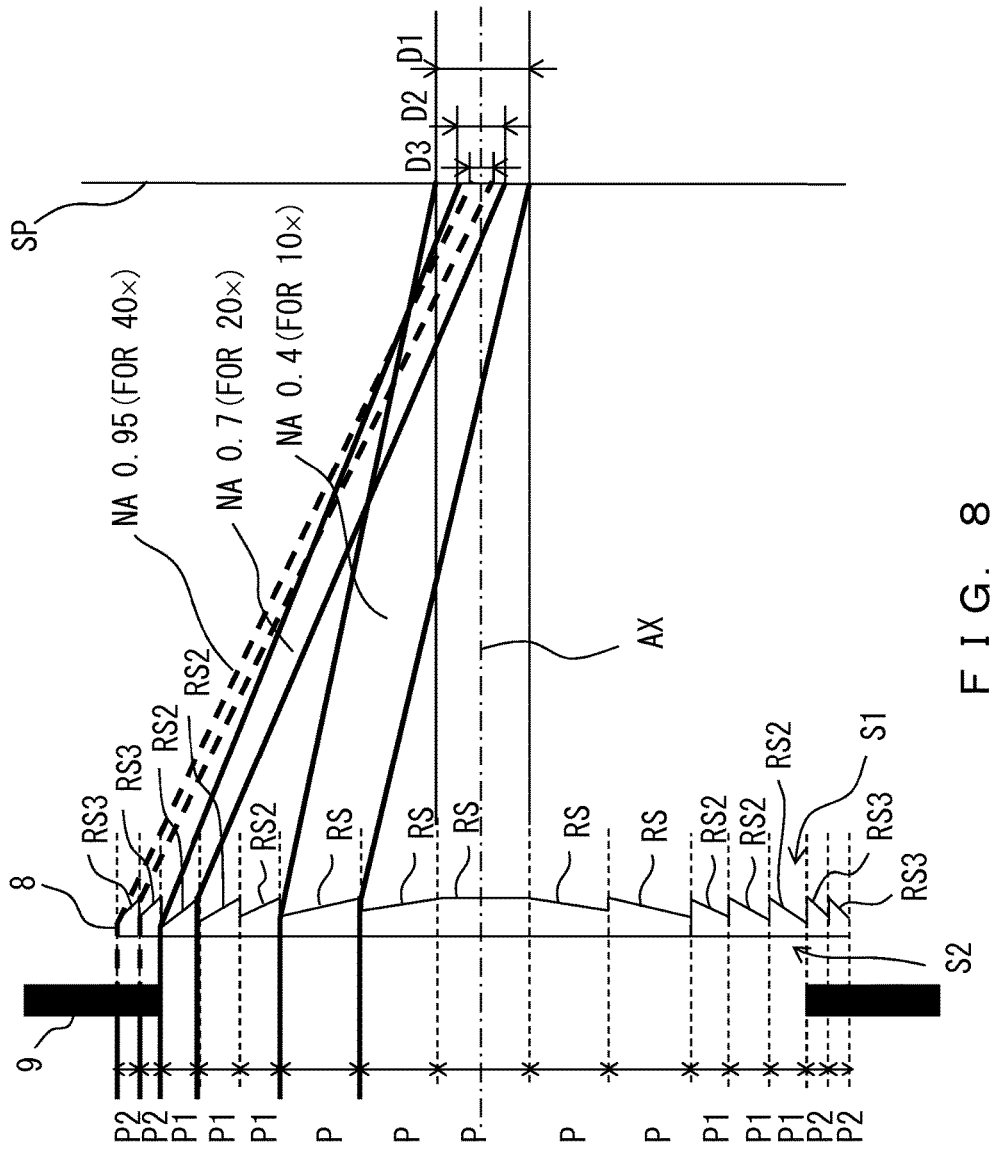
FIG. 8 illustrates a function of a variable aperture which is arranged on an incident side of the illumination optical element according to the second embodiment of the present invention.

As illustrated in FIG. 8, the illumination optical system and the illumination apparatus according to the embodiment of the present invention may include a variable aperture 9 on a front side (incident side) of the illumination optical element 8 to vary a beam diameter of light that enters the illumination optical element 8. The variable aperture 9 is preferably arranged in the proximity of the illumination optical element 8. The variable aperture 9 functions as an aperture stop because a numerical aperture of a light emitted from the illumination optical element 8 changes if a beam diameter of a light entering the illumination optical element 8 varies with the variable aperture 9. The variable aperture 9 can be used, for example, to improve a contrast of a specimen image by reducing a numerical aperture.

<Third Embodiment>

Figure 9:
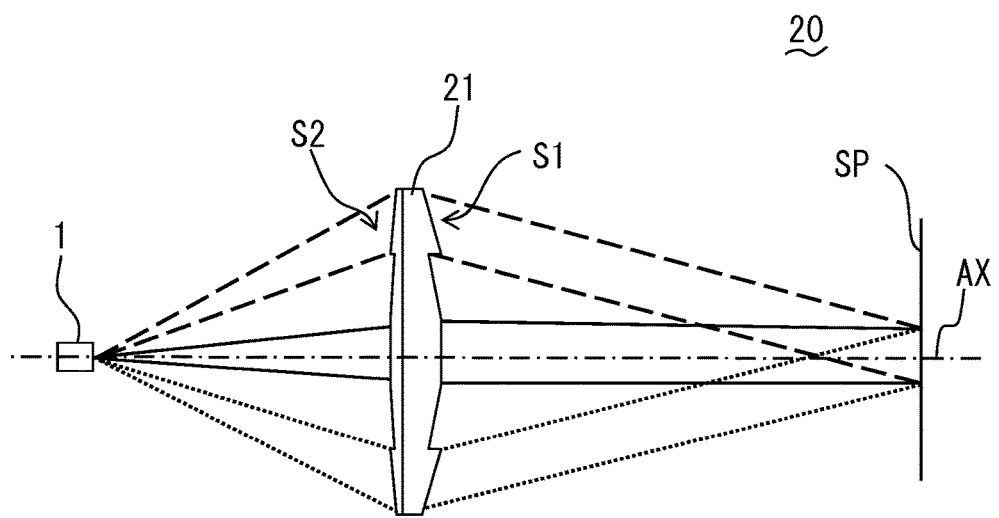
FIG. 9 illustrates a configuration of an illumination apparatus according to a third embodiment of the present invention.

FIG. 9 illustrates a configuration of an illumination apparatus 20 according to an embodiment of the present invention. The illumination apparatus 20 is different from the illumination apparatus 10 according to the first embodiment in including an illumination optical element 21 instead of the illumination optical system 10a (collector lens 2 and illumination optical element 3). In the embodiment of the present invention, the illumination optical element 21 functions as an illumination optical system that irradiates an area A1 of a specimen surface SP with light from a light source 1 in a planar manner.

The illumination optical element 21 is different from the illumination optical element 3 according to the first embodiment in that an optical surface S2 that is an optical surface on a light-source side is formed as a Fresnel surface. It is similar to the illumination optical element 3 regarding the other points.

In the illumination apparatus 20, the light that has entered the illumination optical element 21 is converted into a collimated beam in the optical surface S2 that is a Fresnel surface, so as to enter an optical surface S1. In other words, the optical surface S2 functions similarly to the collector lens 2 of the illumination apparatus 10.

As is the case with the first embodiment, the embodiment of the present invention permits, with fewer optical elements and more easily as compared to a conventional art, suppressing of non-uniformity of illumination caused by the light distribution characteristics of a light source 1. The embodiment further permits an omission of the collector lens 2, so as to suppress non-uniformity of illumination with fewer optical elements than in the first embodiment. This permits an illumination optical system and an entire illumination apparatus to be manufactured compactly at a lower price.

<Fourth Embodiment>

Figure 10:
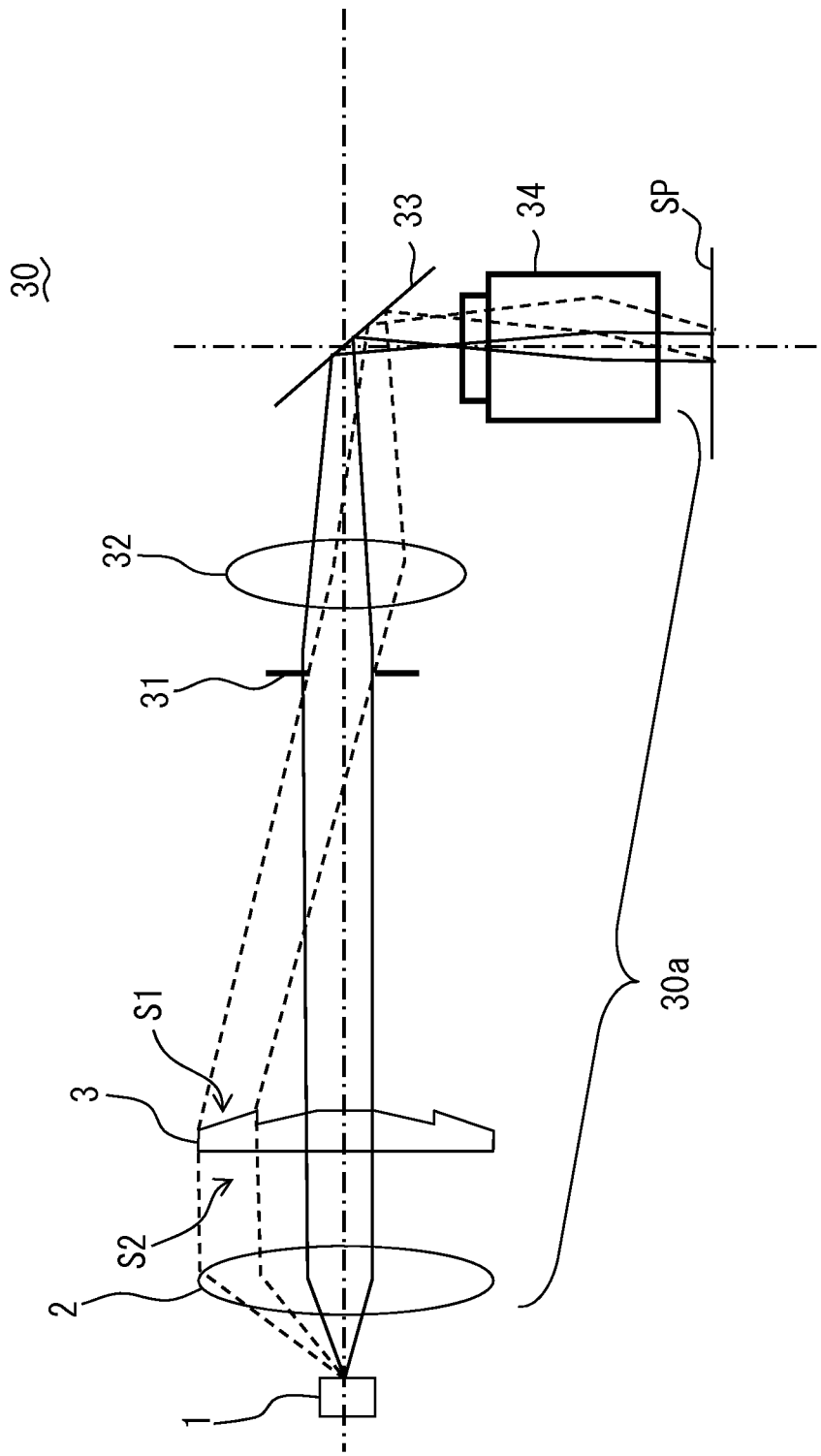
FIG. 10 illustrates a configuration of a microscope according to a fourth embodiment of the present invention.

FIG. 10 illustrates a configuration of a microscope 30 according to an embodiment of the present invention. The microscope 30 is different from the illumination apparatus 10 according to the first embodiment in including an observation optical system (not shown). The microscope 30 is also different from the illumination apparatus 10 according to the first embodiment in including, between an illumination optical element 3 and a specimen surface SP, in order from the illumination optical element 3, a field stop 31, a field stop projection lens (hereinafter referred to as "FS projection lens") 32, a dichroic mirror 33, and an objective 34. The microscope 30 is an illumination apparatus in that it has a function to illuminate a specimen with the configuration illustrated in FIG. 10. Further, in the embodiment of the present invention, a collector lens 2, the illumination optical element 3, the field stop 31, the field stop projection lens 32, the dichroic mirror 33, and the objective 34 function as an illumination optical system 30a that irradiates an area of a specimen surface SP with light from a light source 1 in a planar manner.

The field stop 31 is a variable aperture which is arranged in a plane optically conjugate with the specimen surface SP and is capable of varying its diameter. A conjugate relationship between the field stop 31 and the specimen surface SP is created by the FS projection lens 32 and the objective 34. A size of the area on the specimen surface SP that is irradiated with light from the light source 1 can be changed by varying the diameter of the field stop 31. The dichroic mirror 33 is an optical element that diverges an illumination path and an observation path. A half mirror may be used instead of the dichroic mirror 33.

In the microscope 30, the illumination optical element 3 does not directly irradiate the specimen surface SP with light, but irradiates the field stop 31 arranged in the plane optically conjugate with the specimen surface SP with light. In other words, the plane optically conjugate with the specimen surface SP that is provided with the field stop 31 is an illumination target surface for the illumination optical element 3.

As is the case with the first embodiment, the embodiment of the present invention permits, with fewer optical elements and more easily as compared to a conventional art, suppressing of non-uniformity of illumination caused by the light distribution characteristics of the light source 1. The embodiment further permits the illumination target surface (plane of the field stop 31) to be magnified or demagnified so as to be projected onto the specimen surface SP. This permits a size of an illuminated area to be illuminated on the specimen surface SP to be different from that of a pitch P of refractive surfaces RS in the illumination optical element 3.

While in FIG. 10, the illumination optical element 3 configures epi-illumination means of the microscope 30, the illumination optical element 3 may configure trans-illumination means which illuminates the specimen surface SP through a condenser lens.

<Fifth Embodiment>

Figure 11:
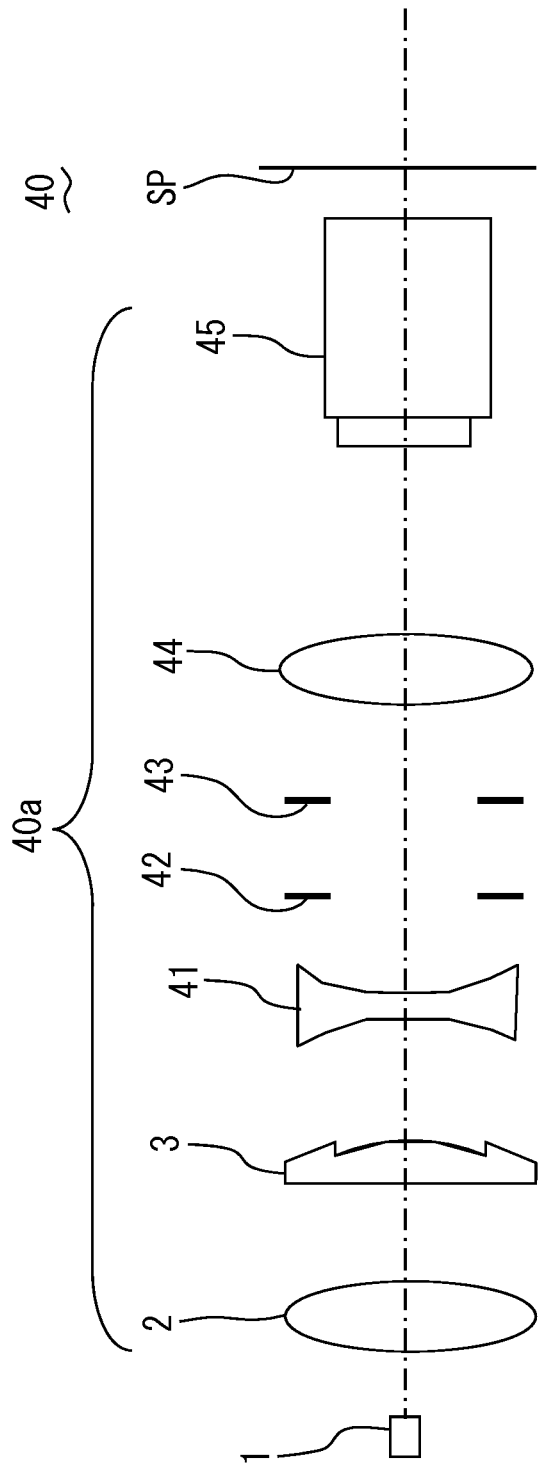
FIG. 11 illustrates a configuration of a microscope according to a fifth embodiment of the present invention.
Figure 12:
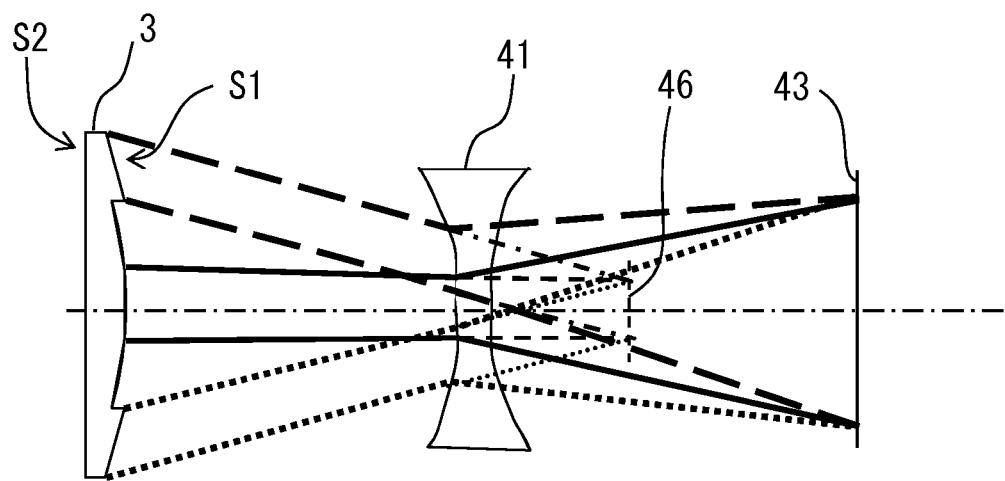
FIG. 12 illustrates a positional relationship between an illumination optical element, a concave lens, and a field stop in the microscope according to the fifth embodiment of the present invention.

FIG. 11 illustrates a configuration of a microscope 40 according to an embodiment of the present invention. FIG. 12 illustrates a positional relationship between an illumination optical element 3, a concave lens 41, and a field stop 43 in the microscope 40. The microscope 40 is different from the illumination apparatus 10 according to the first embodiment in including an observation optical system (not shown). The microscope 40 is also different from the illumination apparatus 10 according to the first embodiment in including, between the illumination optical element 3 and a specimen surface SP, in order from the illumination optical element 3, the concave lens 41, an aperture stop 42, a field stop 43, an FS projection lens 44, and an objective 45. The microscope 40 is an illumination apparatus in that it has a function to illuminate a specimen. Further, in the embodiment of the present invention, a collector lens 2, the illumination optical element 3, the concave lens 41, the aperture stop 42, the field stop 43, the FS projection lens 44, and the objective 45 function as an illumination optical system 40a that irradiates an area of the specimen surface SP with light from a light source 1 in a planar manner.

The field stop 43, the FS projection lens 44, and the objective 45 correspond to the field stop 31, the FS projection lens 32, and the objective 34 of the microscope 30, respectively. In other words, in the microscope 40, a conjugate relationship between the field stop 43 and the specimen surface SP is created by the FS projection lens 44 and the objective 45.

In the microscope 30 according to the fourth embodiment, the illumination optical element 3 directly irradiates the field stop 31 with light. Thus, in order to vary a size of an area to be illuminated of the specimen surface SP by use of the field stop 31, a pitch P of refractive surfaces RS of the illumination optical element 3 needs to have at least a similar size to a diameter of the field stop 31. However, increasing the size of the pitch P is likely to upsize the illumination optical element 3. In addition, the pitch can have a larger size without changing the size of the illumination optical element 3 if the number of the refractive surfaces RS is decreased, but such a configuration may result in reducing the advantage of uniformizing illumination.

On the basis of the discussion above, the embodiment of the present invention permits magnifying of a diameter of a beam refracted on a refractive surface RS of the illumination optical element 3 by use of the concave lens 41, so as to irradiate the field stop 43 with the beam having a magnified diameter.

As illustrated in FIG. 12, in the illumination optical system 40a and the microscope 40, the concave lens 41 is arranged so that a virtual image of the field stop 43 is formed by the concave lens 41 on a plane 46 (illumination target surface) on which a plurality of beams from the illumination optical element 3 overlap without the concave lens 41. This permits the specimen surface SP, the field stop 43, and the plane 46 to have a positional relationship optically conjugate with one another. Thus, making the pitch P of the illumination optical element 3 a similar size to the virtual image (demagnified image) of the field stop 43 permits a light with a beam diameter that has a similar size to the diameter of the field stop 43 to be injected into the field stop 43 without decreasing in the function to suppress non-uniformity of illumination.

As is the case with the first embodiment, the embodiment of the present invention permits, with fewer optical elements and more easily as compared to a conventional art, suppressing of non-uniformity of illumination caused by the light distribution characteristics of the light source 1. As is the case with the fourth embodiment, the embodiment further permits the illumination target surface to be magnified or demagnified so as to be projected onto the specimen surface SP. This permits a size of an area to be illuminated on the specimen surface SP to be different from that of the pitch P of the refractive surfaces RS in the illumination optical element 3. Furthermore, the embodiment of the present invention permits obtaining of the advantage mentioned above while preventing of an increase in size of the illumination optical element 3 because the pitch P of the illumination optical element 3 only needs to have a similar size to the virtual image of the field stop 43.

In the illumination optical system 40a and the microscope 40, a pupil position varies according to the design of the concave lens 41. Thus, a pupil position can be formed in a desired position by the concave lens 41, which permits an easy connection with a conventional epi-illumination floodlighting tube including an FS projection lens. Further, a telecentricity on the side of the specimen surface SP can vary according to the design of the concave lens 41. This is also of advantage to a connection with a conventional epi-illumination floodlighting tube.

<Sixth Embodiment>

FIG. 13 illustrates a configuration of a projector 50 according to an embodiment of the present invention. The projector 50 is a so-called liquid-crystal projector. The projector 50 includes a light source 1 which emits illumination light, a collector lens 2, an illumination optical element 3, a liquid-crystal display (LCD) 51, a control unit 52 which controls the LCD 51, and a projection lens 53 which projects the LCD 51 onto a screen 60. The projector 50 is an illumination apparatus in that it has a function to illuminate the screen 60. Further, in the embodiment of the present invention, the collector lens 2, the illumination optical element 3, the LCD 51, and the projection lens 53 function as an illumination optical system 50a that irradiates an area of the specimen surface SP with light from the light source 1 in a planar manner.

In the projector 50, the control unit 52 that has received a video signal controls each pixel of the LCD 51 according to the video signal, so that an image according to a state of the LCD 51 is projected onto the screen 60.

In general, in a liquid-crystal projector having an LCD, the LCD is preferably illuminated uniformly. According to the embodiment of the present invention, arranging the LCD 51 in a position in which beams obtained by dividing light in the illumination optical element 3 overlap permits suppressing of non-uniformity of illumination caused by the light distribution characteristics of the light source 1, so as to illuminate the LCD 51 uniformly. Further, it is possible to suppress non-uniformity of illumination with fewer optical elements, which permits a reduced size of the illumination optical system 50a and the projector 50.

<Seventh Embodiment>

FIG. 14 illustrates a configuration of a projector 70 according to an embodiment of the present invention. The projector 70 is different from the projector 50 in including a mirror 71, a digital mirror device (DMD™) 72, a control unit 73, and a projection lens 74 instead of the LCD 51, the control unit 52, and the projection lens 53. The projector 70 is a so-called DLP projector. The projector 70 is an illumination apparatus in that it has a function to illuminate a screen 60. Further, in the embodiment of the present invention, a collector lens 2, an illumination optical element 3, the mirror 71, the DMD 72, and the projection lens 74 function as an illumination optical system 70a that irradiates an area of the specimen surface SP with light from a light source 1 in a planar manner.

In the projector 70, the control unit 73 that has received a video signal controls each mirror of the DMD 72 according to the video signal, so that an image according to a state of the DMD 72 is projected onto the screen 60.

In general, in a DLP projector having a DMD, the DMD is preferably illuminated uniformly. According to the embodiment of the present invention, arranging the DMD 72 in a position in which beams obtained by dividing light in the illumination optical element 3 overlap permits suppressing of non-uniformity of illumination caused by the light distribution characteristics of the light source 1, so as to illuminate the DMD 72 uniformly. Further, it is possible to suppress non-uniformity of illumination with fewer optical elements, which permits a reduced size of the illumination optical system 70a and the projector 70.

<Eighth Embodiment>

Figure 15:
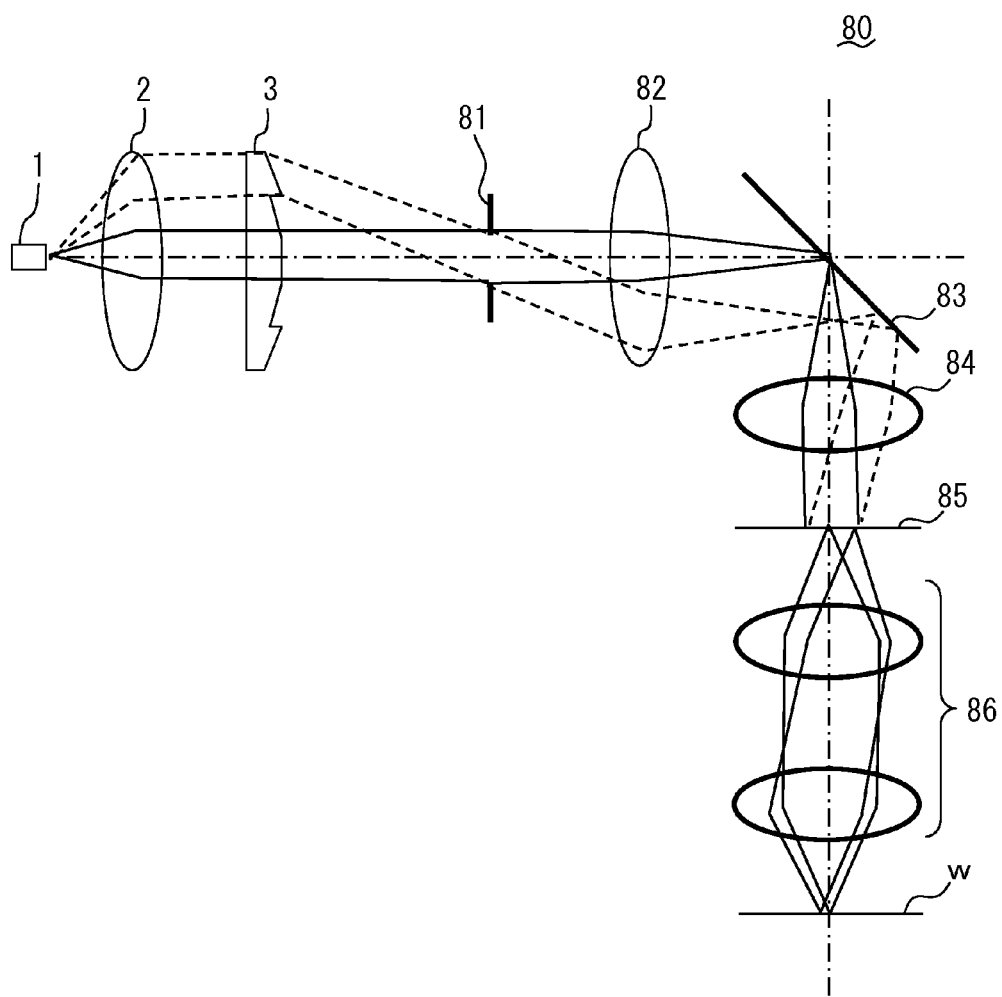
FIG. 15 illustrates a configuration of a stepper according to an eighth embodiment of the present invention.

FIG. 15 illustrates a configuration of a stepper 80 according to an embodiment of the present invention. The stepper 80 includes a light source 1 which emits illumination light, a collector lens 2, an illumination optical element 3, a field stop 81, a condenser lens 82, a mirror 83, a condenser lens 84, a reticle 85, and a projection optical system 86. The stepper 80 is an illumination apparatus which illuminates the reticle 85 so as to project a pattern of the reticle 85 onto a wafer W. Further, in the embodiment of the present invention, the collector lens 2, the illumination optical element 3, the field stop 81, the condenser lens 82, the mirror 83, and the condenser lens 84 function as an illumination optical system that irradiates an area of the reticle 85 with light from the light source 1 in a planar manner.

The field stop 81 is a variable aperture that is arranged in a plane optically conjugate with the reticle 85. A conjugate relationship between the field stop 81 and the reticle 85 is created by the condenser lens 82 and the condenser lens 84. A size of an area on the reticle 85 that is irradiated with the light from the light source 1 can be changed by varying a diameter of the field stop 81. The projection optical system 86 projects a pattern formed in the reticle 85 onto the wafer W.

In the stepper 80, illuminating the reticle 85 uniformly permits a correct projection of a pattern formed in the reticle 85. According to the embodiment of the present invention, arranging the field stop 81 in a position in which beams obtained by dividing light in the illumination optical element 3 overlap permits suppressing of non-uniformity of illumination caused by the light distribution characteristics of the light source 1, so as to illuminate the reticle 85 uniformly. Further, it is possible to suppress non-uniformity of illumination with fewer optical elements.

<Ninth Embodiment>

Figure 16:
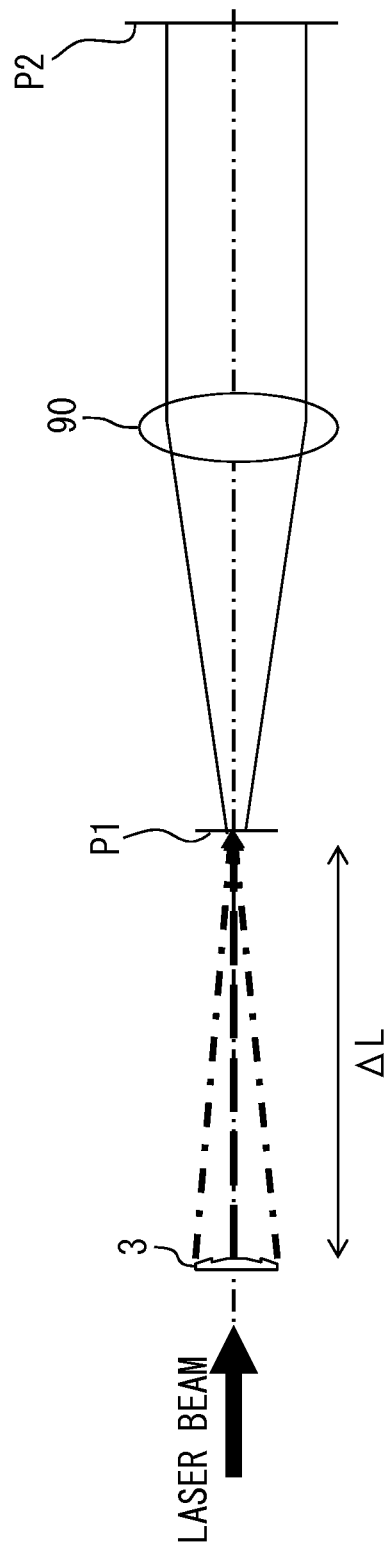
FIG. 16 illustrates a method for suppressing non-uniformity of illumination caused by a laser.

FIG. 16 illustrates a method for suppressing non-uniformity of illumination caused by a laser. If a laser beam is directly irradiated, an illumination target surface is not illuminated uniformly because a laser beam emitted by a laser has a Gaussian distribution. Such non-uniformity of illumination caused by a laser can be suppressed by arranging an illumination optical element 3 in an optical path of a laser beam, as illustrated in FIG. 16.

However, the laser beam emitted from the illumination optical element 3 has a greater NA than when it enters. In order to reduce an NA of the laser beam as much as possible, the illumination optical element 3 preferably has a refractive surface RS designed so as to make a distance ΔL to a plane P1 longer. Further, an area to be illuminated can be enlarged by magnifying the plane P1 with use of a relay lens 90 and projecting it onto a plane P2. Then, the NA of the laser beam can be further reduced by magnifying a range to be illuminated.

Figure 17:
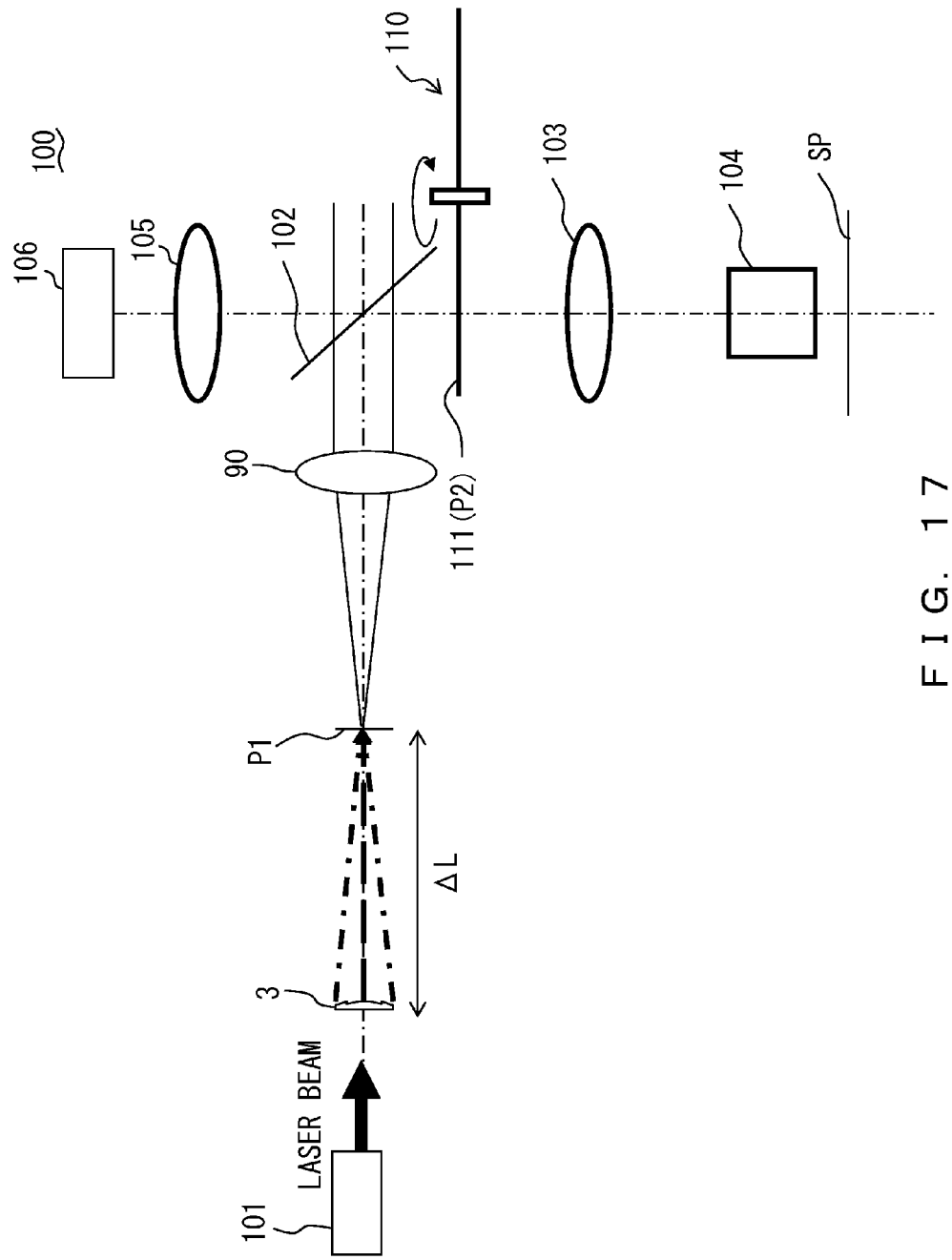
FIG. 17 illustrates a configuration of a laser microscope according to the eighth embodiment of the present invention.

FIG. 17 illustrates a configuration of a laser microscope 100 according to the embodiment of the present invention. The laser microscope 100 is a disk-scanning laser microscope that is configured to illuminate a wide range uniformly with a laser beam as mentioned above.

The laser microscope 100 includes a laser 101, an illumination optical element 3 that irradiates the plane P1 in a planar manner, the relay lens 90 that magnifies the plane P1 and projects it onto a disk surface 111 of a rotary disk 110, and a dichroic mirror 102 on which a laser beam is reflected and through which a fluorescence generated from a specimen surface SP is transmitted. The laser microscope 100 further includes the rotary disk 110 that is scanning means, a tube lens 103, an objective 104, a light collecting lens 105, and a CCD 106. Further, in the embodiment of the present invention, the illumination optical element 3, the relay lens 90, the dichroic mirror 102, the rotary disk 110, the tube lens 103, and the objective 104 function as an illumination optical system that irradiates an area of the specimen surface SP with light from the laser 101 in a planar manner.

The rotary disk 110 is scanning means which has an area (area to be transmitted through) in which, for example, pinholes or slits are formed and through which a light is transmitted, and which is configured so that a position of the area to be transmitted through changes when rotated. The rotary disk 110 is arranged so that the disk surface 111 (plane P2) has a positional relationship optically conjugate with the specimen surface SP, the plane P1, and a light-receiving surface of the CCD 106.

The laser microscope 100 permits illuminating of a wide area of the disk surface 111 in a planar manner by use of a laser beam having a distribution more uniform than the Gaussian distribution. This permits scanning of the specimen surface SP by a uniformly intense laser beam. According to a conventional art, a laser beam only in the vicinity of peaks in the Gaussian distribution is used for illumination in order to suppress non-uniformity of illumination caused by the Gaussian distribution. On the other hand, according to the laser microscope 100, a laser beam emitted from the laser 101 can be used for illumination without waste.

The embodiments described above are just examples to facilitate understanding of the present invention, and the invention is not limited to these embodiments. Various modifications and alterations may be made to the illumination optical systems, the illumination apparatuses, and the illumination optical elements without departing from the spirit and scope of the invention. A combination of some of the features in the embodiments described in the specification of the present invention may be provided as a single embodiment.

In the embodiments described above, a light entering the illumination optical element 3 is a collimated beam, but a beam entering the illumination optical element 3 may not be a completely collimated beam. When the light entering the illumination optical element 3 has a non-constant light intensity in a direction perpendicular to the optical axis AX, the advantage of averaging the distribution can be expected to be attained by dividing the light to overlap the lights obtained by the division.

What is claimed is:

1. An illumination optical system comprising:
a light source;
a collimating lens that converts light emitted from the light source into a collimated beam and that emits the collimated beam; and
an illumination optical element that irradiates a predetermined area of an illumination target surface with light in a planar manner,
wherein:
the illumination optical element has a first optical surface directed toward the illumination target surface,
the first optical surface has, in a perpendicular direction which is perpendicular to an optical axis, a plurality of first refractive surfaces each of which refracts light from the collimating lens toward the predetermined area and which are formed at a constant pitch which matches a width of the predetermined area,
the plurality of first refractive surfaces have concentric circular shapes point-symmetric about the optical axis or concentric rectangular shapes line-symmetric with respect to the optical axis, and have, in a section view that includes the optical axis, shapes of straight lines that form different angles with the optical axis,
a straight line of one of the first refractive surfaces which is closer to the optical axis forms a larger angle with the optical axis in the section view that includes the optical axis, than a straight line of another one of the first refractive surfaces that is farther from the optical axis, such that the light from the collimating lens is divided for each of the plurality of first refractive surfaces and such that all divisions of the divided light overlap each other within the predetermined area of the illumination target surface while remaining in the form of a collimated beam having a beam diameter matching the constant pitch, and
in the section view that includes the optical axis, (i) the optical axis passes through one of the first refractive surfaces, the one of the first refractive surfaces through which the optical axis passes is perpendicular to the optical axis in the section view that includes the optical axis, and the first refractive surfaces that are directly adjacent to the one of the first refractive surfaces through which the optical axis passes are continuous with the one of the first refractive surfaces through which the optical axis passes with no rise portion therebetween, or (ii) the optical axis passes through a boundary between two adjacent ones of the first refractive surfaces, and the two adjacent ones of the first refractive surfaces are inclined with respect to a plane extending in the perpendicular direction which is perpendicular to the optical axis.

2. The illumination optical system according to claim 1, wherein the first optical surface further has, in the perpendicular direction, a plurality of second refractive surfaces each of which refracts light toward a portion of the predetermined area, the plurality of second refractive surfaces being provided farther away from the optical axis than the plurality of first refractive surfaces.

3. The illumination optical system according to claim 1, wherein:
the illumination optical element has a second optical surface opposite the first optical surface, and
the second optical surface is a Fresnel surface.

4. An illumination apparatus comprising the illumination optical system according to claim 1.

5. The illumination optical system according to claim 2, wherein:
the plurality of second refractive surfaces have, in the section view that includes the optical axis, shapes of straight lines that form different angles with the optical axis, and
one of the second refractive surfaces which is closer to the optical axis forms a larger angle with the optical axis in the section view that includes the optical axis, than another one of the second refractive surfaces that is farther from the optical axis.

6. The illumination optical system according to claim 2, further comprising a variable aperture that varies a beam diameter of light that enters the illumination optical element.

7. The illumination optical system according to claim 5, wherein the plurality of second refractive surfaces are formed in the perpendicular direction at a constant pitch that is shorter than the pitch at which the plurality of first refractive surfaces are formed.

8. An illumination optical element that irradiates a predetermined area of an illumination target surface with light in a planar manner, the illumination optical element having an optical surface directed toward the illumination target surface, wherein:
the optical surface has, in a perpendicular direction which is perpendicular to an optical axis, a plurality of refractive surfaces each of which refracts light toward the predetermined area and which are formed in the perpendicular direction at a constant pitch which matches a width of the predetermined area,
the plurality of refractive surfaces have concentric circular shapes point-symmetric about the optical axis or concentric rectangular shapes line-symmetric with respect to the optical axis, and have, in a section view that includes the optical axis, shapes of straight lines that form different angles with the optical axis,
one of the refractive surfaces which is closer to the optical axis forms a larger angle with the optical axis in the section view that includes the optical axis, than another one of the refractive surfaces that is farther from the optical axis, such that light that has entered the illumination optical element as a collimated beam is divided for each of the plurality of refractive surfaces and such that all divisions of the divided light overlap each other within the predetermined area of the illumination target surface while remaining in the form of a collimated beam having a beam diameter matching the constant pitch, and
in the section view that includes the optical axis, (i) the optical axis passes through a first one of the refractive surfaces, the first one of the refractive surfaces is perpendicular to the optical axis in the section view that includes the optical axis, and the refractive surfaces that are directly adjacent to the first one of the refractive surfaces are continuous with the first one of the refractive surfaces with no rise portion therebetween, or (ii) the optical axis passes through a boundary between two adjacent ones of the refractive surfaces, and the two adjacent ones of the refractive surfaces are inclined with respect to a plane extending in the perpendicular direction which is perpendicular to the optical axis.

9. An illumination optical system comprising:
a light source;
a collimating lens that converts light emitted from the light source into a collimated beam and that emits the collimated beam; and an illumination optical element that includes a plurality of refractive surfaces, the plurality of refractive surfaces being formed in a perpendicular direction which is perpendicular to an optical axis at a constant pitch which matches a width of a predetermined area of an illumination target surface, and having, in a section view that includes the optical axis, shapes of straight lines that form different angles with the optical axis, such that, in the section view that includes the optical axis, the collimated beam that has entered the illumination optical element is divided for each of the plurality of refractive surfaces and emitted from the illumination optical element such that all divisions of the collimated beam overlap each other in a planar manner within the predetermined area of the illumination target surface, one of the plurality of refractive surfaces which is closer to the optical axis forming a larger angle with the optical axis in the section view that includes the optical axis than another one of the plurality of refractive surfaces that is farther from the optical axis, the plurality of refractive surfaces having concentric circular shapes point-symmetric about the optical axis or concentric rectangular shapes line-symmetric with respect to the optical axis, and in the section view that includes the optical axis, the optical axis passing through (i) a first one of the refractive surfaces, the first one of the refractive surfaces being perpendicular to the optical axis in the section view that includes the optical axis, and the refractive surfaces that are directly adjacent to the first one of the refractive surfaces being continuous with the first one of the refractive surfaces with no rise portion therebetween, or (ii) a boundary between two adjacent ones of the refractive surfaces, the two adjacent ones of the refractive surfaces being inclined with respect to a plane extending in the perpendicular direction which is perpendicular to the optical axis.

\* \* \* \* \*